United States Patent [19]

Van Pelt

[11] Patent Number: 4,557,741
[45] Date of Patent: Dec. 10, 1985

[54] GRADIENT COLUMN FREEZE CONCENTRATION SYSTEM

[75] Inventor: Wilhelmus H. J. M. Van Pelt, 's-Hertogenbosch, Netherlands

[73] Assignee: Grasso's Koniklyke Machine Fabriekon N.V., 's-Hertogenbosch, Netherlands

[21] Appl. No.: 579,512

[22] Filed: Feb. 13, 1984

[51] Int. Cl.⁴ .............................................. B01D 9/04
[52] U.S. Cl. ......................................... 62/541; 62/542
[58] Field of Search ................... 62/532, 540, 541, 542

[56] References Cited

U.S. PATENT DOCUMENTS 3,872,009  3/1975  Thjssen .
4,004,886  1/1977  Thijssen et al. .
4,406,679  9/1983  Wrobel et al. ........................ 62/541

Primary Examiner—Frank Sever
Attorney, Agent, or Firm—Cushman, Darby & Cushman

[57] ABSTRACT

An improved freeze concentration system of the type in which a slurry of crystals and mother liquor are formed in a crystallizer and fed to the concentrated end of a gradient column. The crystals grow in size in the column as they move to the dilute end of the column. The dilute slurry is transferred to a holding tank where the crystals grow further and then to a wash column. A slurry of larger crystals from the holding tank or the column outlet are fed back to the column inlet so that crystals in the concentrated slurry dissolve and reform on the large crystals of the fed back slurry. The units can be connected in a multistage, counter-current system.

6 Claims, 2 Drawing Figures

GRADIENT COLUMN FREEZE CONCENTRATION SYSTEM

BACKGROUND AND SUMMARY OF THE INVENTION

The invention relates to an improved method and apparatus for separating two or more substances with different freezing points from a solution of a mixture of such substances using freeze concentration.

Concentrating aqueous beverages for storage, transportation and sale has a number of substantial advantages and is being used more and more widely for an increasing variety of beverages. For some products, for example, coffee and tea, the purpose of concentration is to produce a product which is convenient for the consumer to use. For other products, such as wine, milk, beer, vinegar and the like, the greatest advantage may lie in reducing the bulk of material, and thus reducing the expense of storage and transportation.

Concentration of such aqueous beverages can be done in one of three ways—evaporation, freeze concentration, or reverse osmosis. In evaporation techniques, the beverage is heated or steam is passed therethrough to remove the water by evaporation. In freeze concentration techniques, a slurry of ice is formed in the beverage and the ice then separated from the resulting concentrated liquor. One of the drawbacks to evaporation techniques is that many of the subtle flavor components of aqueous beverages are very volatile and readily escape during evaporation. This difficulty can in part be overcome by stripping many of these components before evaporation and returning them to the concentrated beverage thereafter. However, some degradation in flavor seems to be inevitable with evaporation techniques. Reverse osmosis is non-selective and flavor components are lost making it unsatisfactory for concentration of aqueous beverages.

Freeze concentrated products do not suffer from degradation since retention of flavor components is almost 100%. The main drawbacks in the past of freeze concentration processes have been expense and insufficient volume of operation.

A number of advances in recent years have made freeze concentration competitive with evaporation techniques and, indeed, for many applications clearly superior over this competing technology. In a typical freeze concentration system a slurry of tiny ice crystals is grown in a scrape surface heat exchanger or the like and continuously supplied to a recrystallization vessel in which the crystals grow. The patent to Thijssen et al U.S. Pat. No. 4,004,886 describes a process and apparatus of this general type in which a filter is used in the recirculation path to the scrape surface heat exchanger so that crystals are substantially prevented from leaving the recrystallizing vessel. Almost all the crystals in the recrystallizer melt and reform on a very few small seed crystals to produce a crystal slurry having relatively uniformsized crystals therein which slurry is continuously removed from the recrystallizer as a crystal suspension. Not only is residence time in the system substantially reduced and, therefore, the efficiency of the system improved, but the resulting uniform-sized seed crystals can be easily separated in a wash column, for example as described in Thijssen U.S. Pat. No. 3,872,009.

Additional economies are achieved by multistage systems using several sets of scrape surface heat exchangers and recrystallizing vessels connected in series as taught in U.S. Pat. No. 4,316,368, the disclosure of which is hereby incorporated by reference. The slurry of ice crystals drawn from one recrystallizing vessel is supplied to the next where the crystals continue to grow larger and larger. Concentrated mother liquor is moved in the opposite direction and the larger crystals eventually passed to a wash column. Some of the crystals are passed in the same direction as the mother liquor so that crystals in that preceding recrystallizing vessel melt and reform on the larger crystals. Thus, crystal growth takes place on crystals which already have grown large and can take place in a less concentrated solution. Residence time is decreased, capacity is increased and the efficiency of freeze concentration is substantially improved.

U.S. Pat. No. 4,406,679, the disclosure of which is hereby incorporated by reference, describes a specific freeze concentration system in which a slurry of crystals is formed in a freeze crystallizer and supplied to a so-called gradient column where the crystals are separated from the concentrated mother liquor and transferred to a dilute mother liquor. According to the patent, some crystal growth may also take place in the gradient column. The resultant dilute slurry is transferred to a holding tank in which the residence time is said to permit significant growth in crystal size. The dilute slurry with the larger crystals is then supplied to a purifier, more particularly a wash column, where the slurry is separated into mother liquor and oure crystals. The mother liquor is returned to the gradient column.

The present invention relates to improvements in the system described in said U.S. Pat. No. 4,406,679. In a first improvement, crystals from the gradient column and preferably crystals which have grown in the holding tank are fed back to the input of the gradient column and mixed with the concentrated slurry which is continuously fed thereto. As explained above, the smaller crystals in the concentrated slurry will dissolve and reform on the larger crystals fed back to the input from the holding tank or the output of the gradient column. The result will be improved efficiency of operation and a more uniform size of crystals, leading to more satisfactory operation of the wash column.

In a second improvement a plurality of units as described in U.S. Pat. No. 4,406,679 are connected in series for countercurrent operation. Gradient columns are employed to separate the ice from the slurry between stages.

Other objects and purposes of the invention will be clear from the following detailed description of the drawing.

DETAILED DESCRIPTION OF THE INVENTION

Figure 1:
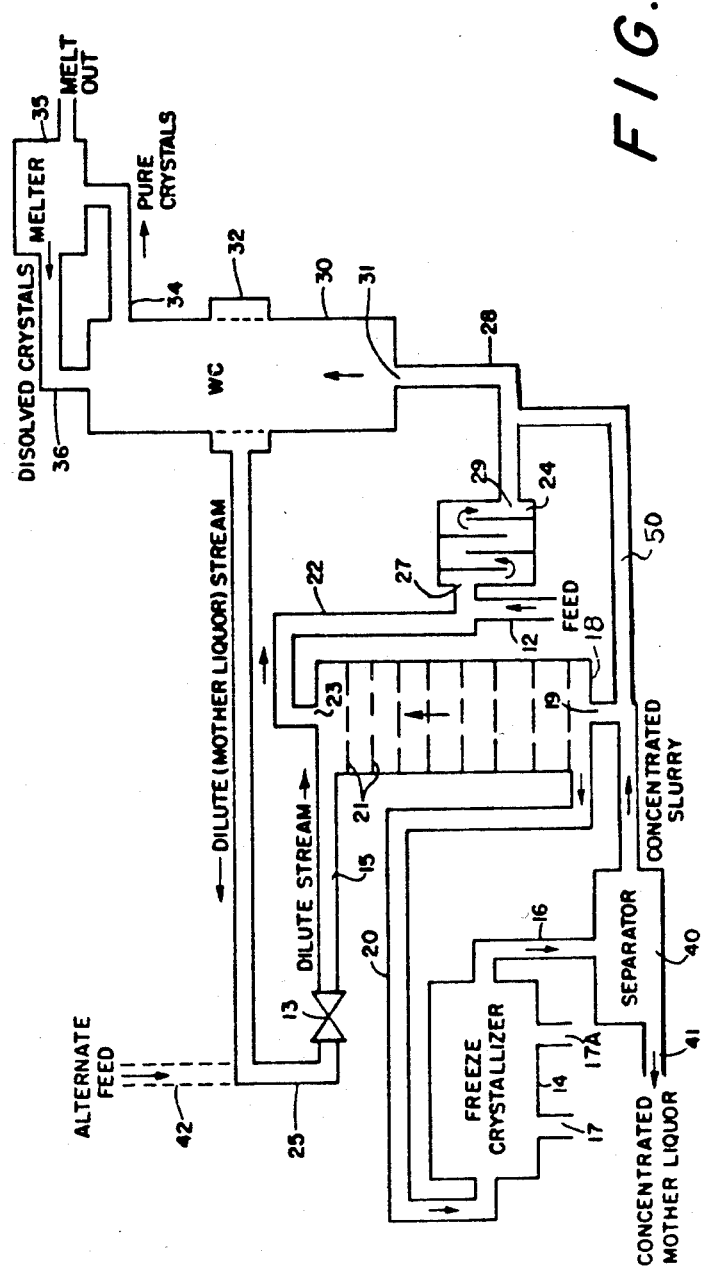
FIG. 1 is a block representation of a freeze concentration system as described in U.S. Pat. No. 4,406,679 and incorporating the unique improvement of the present invention.

The drawing is essentially the same as FIG. 1 of the above-noted patent except for the addition of structure for feeding back a crystal slurry from the output of the holding tank to the input of the gradient column. The numbers are the same as in the drawing of the above-noted patent.

Referring to the FIGURE, freeze crystallizer 14 is supplied with a concentrated liquor less concentrated than the liquor leaving the freeze crystallizer from a gradient column 18 through conduit 20. A first slurry is produced in crystallizer 14 by a refrigerant circulating between inlet 17 and outlet 17a. This first slurry is made up of a concentrated mother liquor and crystals of essentially pure solvent. The concentration of the mother liquor produced in freeze crystallizer 14 is a function of the temperature of the slurry in the freeze crystallizer.

The concentrated slurry is transferred through conduit 16 to an inlet 19 at one end of gradient column 18 through separator 40. The concentrated mother liquor separated from the crystals by a screen or other filter is removed from separator 40 through outlet 41. The net down flow of dilute stream in the gradient column is made up of feed supplied elsewhere.

The gradient column 18 contains a series of spaced baffles 21 which subdivide column 18 into a plurality of serial stages. The result is similar to a multi-stage system of separated components. When a steady state condition is achieved, a concentration gradient is created across the length of the column 18 with the bottom having the most concentrated slurry and the top having the most dilute slurry. The movement of the crystals through the gradient column occurs through a series of progressively more dilute stages.

The residual crystals with concentrated mother liquor adhering on their surfaces entering the gradient column 18 move toward the dilute end of the column. The dilute stream entering the gradient column 18 from the top flows counter to the flow of the crystals.

The dilute stream leaves gradient column 18 through outlet 23 and is transferred through a conduit 22 and a inlet 27 to a holding tank 24. The feed to the system is coupled through conduit 12 where it combines with the dilute slurry from gradient column 18. The purpose of holding tank 24 is to increase the residence time of the crystals within the dilute mother liquor to permit the crystals to ripen and increase significantly in size.

The outlet of the holding tank is fed by conduit 50 back to the gradient tank to achieve the results described above. Preferably feedback is to inlet 19 but may be to some other portion of the gradient column. Alternatively, the output of the gradient column may be fed directly back to its inlet without residence in the holding tank.

The dilute slurry with enlarged crystals is transferred through outlet 29 and conduit 28 to an inlet 31 of a conventional wash column 30. The slurry moves up the wash column until a screen 32 is encountered. Mother liquor is separated from the crystals through screen 32. The exiting mother liquor constitutes a dilute liquor stream and is transferred through conduit 25 and valve 13 to the dilute end of the gradient column. Alternately, the feed may be supplied by conduit 42.

The crystals within the wash column continue moving up the wash column where they are washed by an incoming liquid which generally comprises dissolved crystals. The washing liquid displaces mother liquor from the surfaces of the crystals purifying the crystals. The pure crystals are removed from the wash column through conduit 34 and melted in a conventional melter 35. A portion of the melted crystal is supplied to the wash column 30 through conduit 36 to wash the crystals and to displace the mother liquor from the surface of the crystals.

Figure 2:
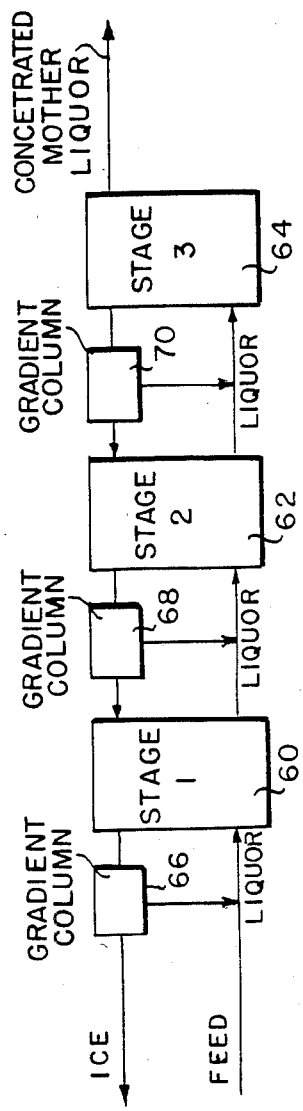
FIG. 2 is a block representation of a plurality of units as in FIG. 1 connected for counter-current operation.

In FIG. 2, three units 60, 62 and 64 as shown in FIG. 1 form three stages of a multi-stage counter-current system. Feed passes through the stages in the direction of the arrows and is increasingly concentrated. Ice from each stage is separated from its liquid by gradient columns 66, 68 and 70 and passed to the preceding stage where the smaller crystals therein melt and reform thereon. Gradient columns 66, 68 and 70 are as shown in FIG. 1.

Many changes and modifications in the above-described embodiment of the invention can, of course, be carried out without departing from the scope thereof. Accordingly, that scope is intended to be limited only by the scope of the appended claims.

What is claimed is:

1. In a subassembly for preparing crystals for washing having a concentration gradient column having an inlet and an outlet containing a plurality of stages each containing a slurry of mother liquor and crystals, the concentrations of the slurry in each stage being different and varying from concentrated at the inlet of the column to dilute at the outlet, said column having means for receiving a concentrated slurry prior to or at the inlet and delivering dilute liquor at the outlet, said column also including means for removing concentrated mother liquor at the inlet and means for removing dilute slurry from the other end; and holding tank means coupled directly to the outlet of the gradient column for receiving and storing dilute slurry to increase the residence time of said crystals in said dilute slurry to enable the crystals contained therein to ripen and grow in size, and feeding out a slurry with larger crystals at an outlet, the improvement comprising means for feeding back a portion of the slurry at the outlet of said holding tank to the inlet of said gradient column and means for enabling the smaller crystals in said concentrated slurry to dissolve and reform on said larger crystals in said fed back slurry.

2. In a freeze concentration system for a liquid feed stream containing a mixture of substances comprising crystallizing means producing a concentrated slurry from said liquid feed, said slurry having crystals of one of said substances in a concentrated mother liquor of said liquid mixture; means for transferring said crystals from said concentrated liquid mixture to a dilute, less viscous liquid to form a dilute slurry; means for receiving said dilute slurry directly from the outlet of the gradient column for increasing the residence time of said crystals in said dilute slurry for permitting said crystals to grow in size, said enlarged crystals containing mother liquor adhering on their surfaces; and washing means coupled directly to said holding tank for purifying said enlarged crystals and for separating said purified crystals from the dilute mother liquor, the improvement comprising means for feeding back a portion of the slurry at the outlet of said holding tank to the inlet of said transferring means and means for enabling the smaller crystals in said concentrated slurry to dissolve and reform on said larger crystals in said fed back slurry.

3. In a freeze concentration system for a liquid feed stream containing a mixture of substances comprising crystallizing means producing a concentrated slurry from said slurry having crystals of one of said substances in a concentrated mother liquor of said liquid mixture; a concentration gradient column for receiving said first slurry at one end and a dilute liquor stream at the other end, said crystals flowing countercurrent to said dilute liquor stream, said column containing first outlet means adjacent to said one end for removing concentrated mother liquor, second outlet means adjacent to said other end for removing a dilute slurry containing crystals in a dilute mother liquor; means combining the feed stream with said dilute slurry; means for receiving said dilute slurry for increasing the residence time of said crystals in said dilute slurry in a gradient column feed stream and for permitting said crystals to ripen and grow, said ripened crystals containing mother liquor adhering on their surfaces; and washing means for purifying said ripened crystals and for separating said purified crystals from the dilute mother liquor, the improvement comprising means for feeding back a portion of the slurry at the outlet of said holding tank to the inlet of said gradient column and means for enabling the smaller crystals in said concentrated slurry to dissolve and reform on said larger crystals in said fed back slurry.

4. A freeze concentration process comprising:
  cooling a first stream containing a solute to form a slurry of essentially pure solvent crystals in a concentrated mother liquor, said crystals having mother liquor adhered to the surfaces of said crystals;
  substituting a less viscous dilute mother liquor for said concentrated mother liquor to form a dilute slurry in a gradient column;
  passing said dilute slurry directly to a holding tank to allow said crystals to dwell in said dilute mother liquor to enlarge the size of the crystals;
  passing said dilute slurry with enlarged crystals to a purifier for removing dilute mother liquor from the surface of the enlarged crystals;
  supplying feed to said dilute stream of dilute slurry;
  feeding back a portion of the slurry at the outlet of said holding tank to the inlet of said gradient column; and
  causing the smaller crystals in said concentrated slurry to dissolve and reform on said larger crystals in said fed back slurry.

5. A multi-stage freeze concentration system for a liquid feed stream containing a mixture of substances comprising
  a plurality of stages each including crystallizing means producing a concentrated slurry from said liquid feed, said slurry having crystals of one of said substances in a concentrated mother liquor of said liquid mixture; a gradient column for transferring said crystals from said concentrated liquid mixture to a dilute, less viscous liquid to form a dilute slurry; and washing means coupled to said gradient column for purifying said enlarged crystals and for separating said purified crystals from the dilute mother liquor,
  means for feeding back a portion of the crystals from at least one stage to the preceding stage,
  means for enabling the smaller crystals in the preceding stage to dissolve and reform on said larger fed back crystals and
  means for transferring the concentrated liquid to a succeeding stage.

6. A system as in claim 5 wherein said feeding back means includes a gradient column.

* * * * *